US012214729B1

(12) United States Patent
Langetieg et al.

(10) Patent No.: US 12,214,729 B1
(45) Date of Patent: Feb. 4, 2025

(54) INTEGRATED KEYCHAIN ASSEMBLIES FOR IN-VEHICLE STOWAGE OF VEHICULAR KEYS AND KEY FOBS WHILE OPERATING VEHICLES

(71) Applicants: Terence Langetieg, Canaan, NH (US); Jeongung Choi, Seoul (KR)

(72) Inventors: Terence Langetieg, Canaan, NH (US); Jeongung Choi, Seoul (KR)

(*) Notice: Subject to any disclaimer, the term of this patent is extended or adjusted under 35 U.S.C. 154(b) by 0 days.

(21) Appl. No.: 18/226,879

(22) Filed: Jul. 27, 2023

(51) Int. Cl.
*B60R 11/00* (2006.01)

(52) U.S. Cl.
CPC ....... *B60R 11/00* (2013.01); *B60R 2011/0057* (2013.01); *B60R 2011/0078* (2013.01)

(58) Field of Classification Search
CPC ............ A45F 2200/0558; A47G 29/10; B60R 2011/0057; B60R 2011/0078
See application file for complete search history.

(56) References Cited

U.S. PATENT DOCUMENTS

| | | | | |
|---|---|---|---|---|
| 2,954,874 | A * | 10/1960 | Rouse | A47G 29/10 248/220.31 |
| 4,137,740 | A * | 2/1979 | Eckerdt | A44B 15/005 70/456 R |
| 5,529,271 | A * | 6/1996 | Dunchock | B60R 11/0241 248/205.2 |
| 6,290,112 | B1 * | 9/2001 | Iver | A44B 11/266 24/3.12 |
| 6,318,610 | B1 | 11/2001 | Doherty | |
| D469,647 | S * | 2/2003 | Howard | A47G 29/10 D6/569 |
| 11,825,918 | B2 * | 11/2023 | Stearns | F16B 1/00 |
| 2008/0060172 | A1 | 3/2008 | Moss | |
| 2010/0287738 | A1 * | 11/2010 | Amsalem | A45F 5/02 24/3.6 |
| 2015/0164259 | A1 * | 6/2015 | Eckerdt | A47G 29/10 248/220.22 |
| 2020/0178663 | A1 * | 6/2020 | Vogel | E05B 19/00 |
| 2021/0177110 | A1 | 6/2021 | Lee | |

(Continued)

FOREIGN PATENT DOCUMENTS

| CN | 302740156 S | 2/2014 |
|---|---|---|
| CN | 306743646 S | 8/2021 |

(Continued)

*Primary Examiner* — Bradley Duckworth
(74) *Attorney, Agent, or Firm* — Downs Rachlin Martin PLLC

(57) ABSTRACT

Integrated keychain assemblies that each include a keychain fob and a keychain holder for removably receiving and holding the keychain fob. In some embodiments the keychain holder is configured to hold a single instantiation of the keychain fob at a time and is useful, for example, for allowing a driver of a vehicle to conveniently stow a vehicle key fob while operating the vehicle. In some embodiments, the keychain fob includes a body having a mechanical-interlock structure and the keychain holder includes a receiver-base having a mechanical-interlock structure that provides a conformal mechanical interlocking fit that holds the keychain fob against gravity when the integrated assembly is in use. The body and the receiver-base include complementary magnetic-attraction elements that attract one another to hold the keychain fob in the conformal mechanical interlocking fit.

18 Claims, 2 Drawing Sheets

(56) References Cited

U.S. PATENT DOCUMENTS

2023/0173994 A1* 6/2023 Li ........................... H04M 1/04
                                                   248/309.4
2023/0337788 A1* 10/2023 Filko ................... A44B 15/002

FOREIGN PATENT DOCUMENTS

| DE | 4431668 A1 | 3/1996 |
|----|------------|--------|
| EP | 1356747 A2 | 10/2003 |
| GB | 2363707 A | 1/2002 |
| JP | 5918611 A | 1/1984 |
| JP | 2742906 B2 | 2/1998 |
| JP | 1380561 S | 2/2010 |

\* cited by examiner

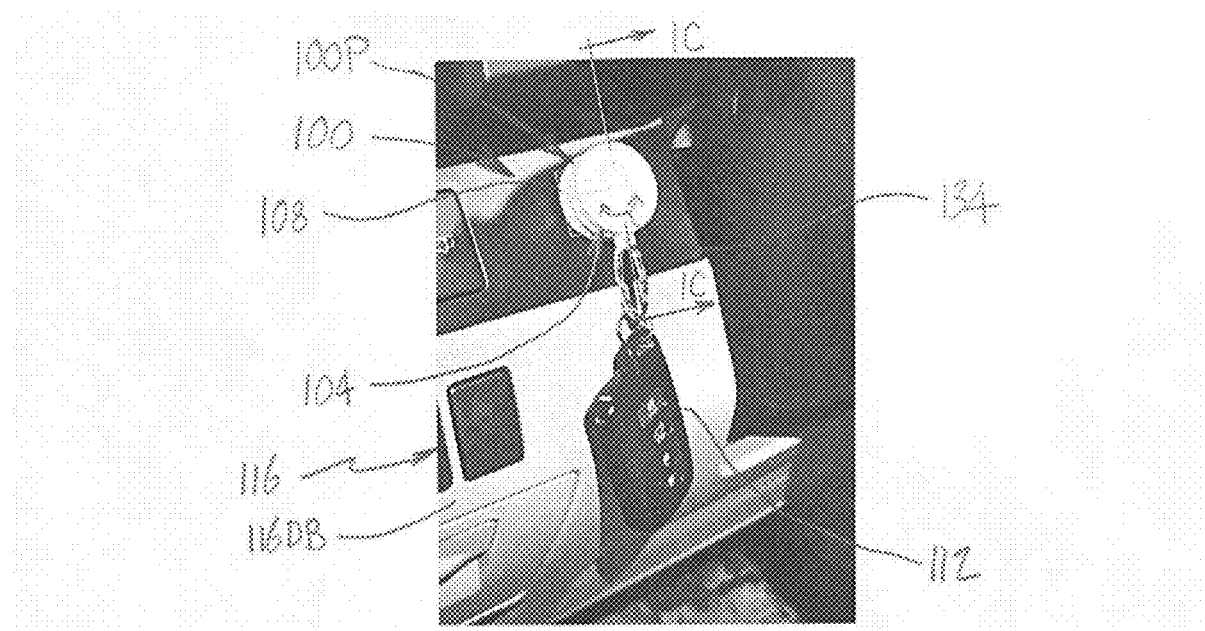
FIG. 1A
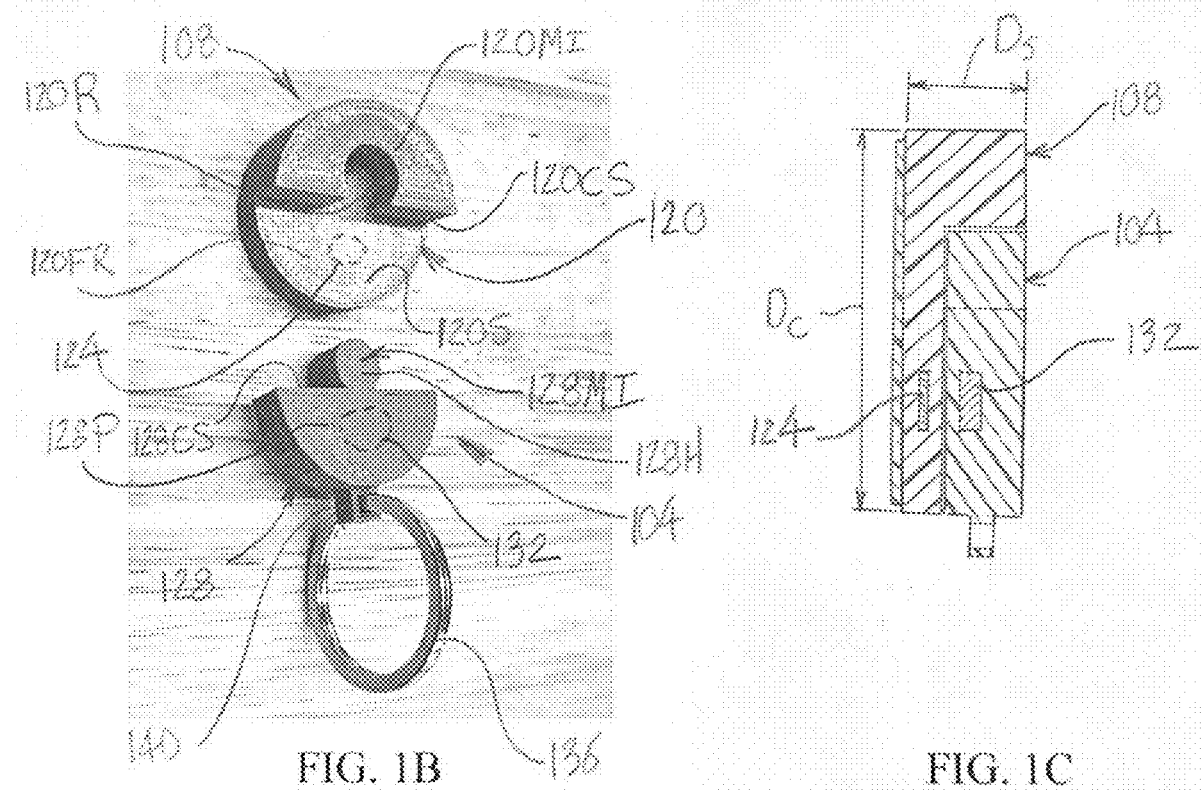
FIG. 1B
FIG. 1C

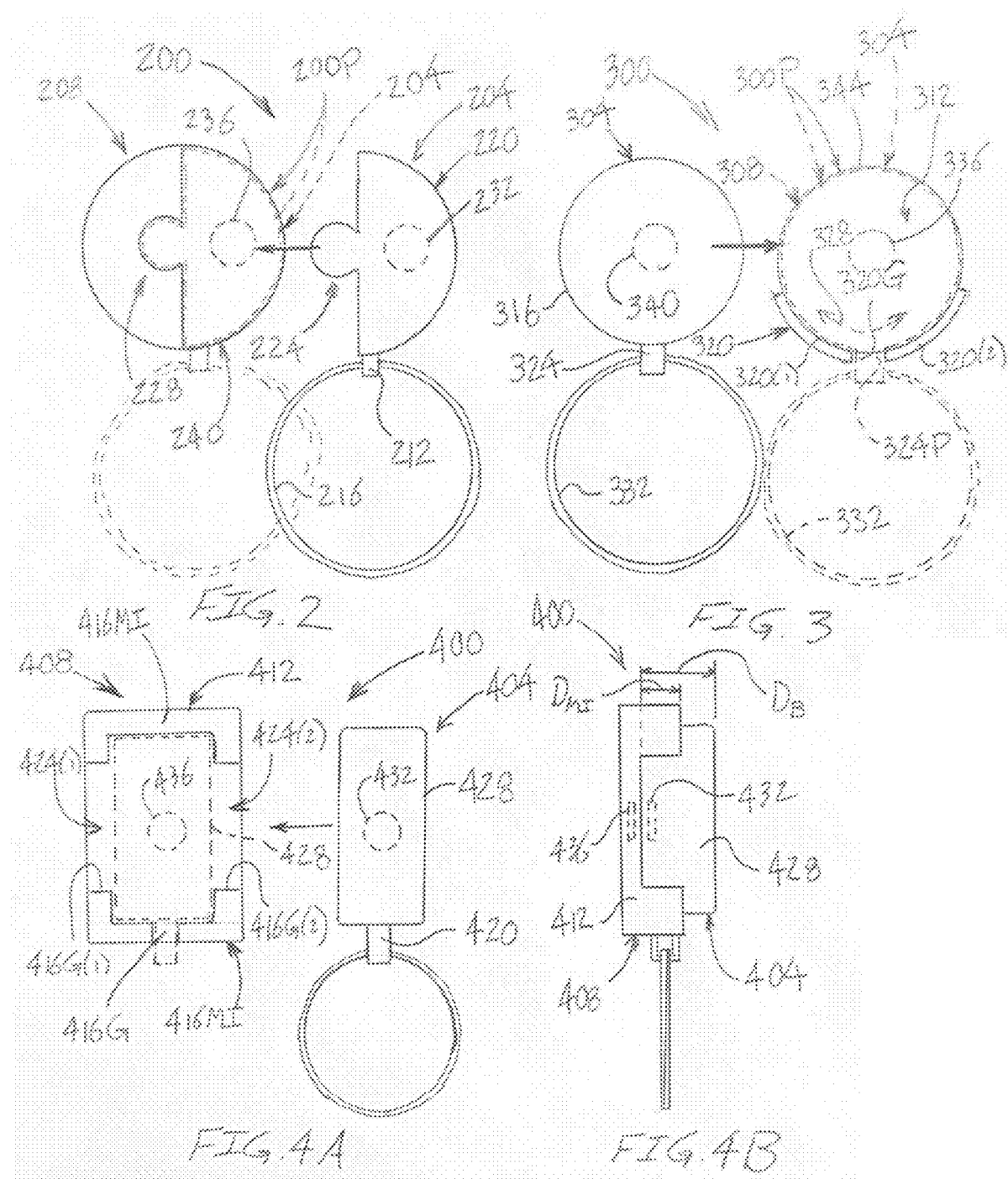

INTEGRATED KEYCHAIN ASSEMBLIES FOR IN-VEHICLE STOWAGE OF VEHICULAR KEYS AND KEY FOBS WHILE OPERATING VEHICLES

FIELD

The present disclosure generally relates to the field of keychains and keychain holders. In particular, the present disclosure is directed to integrated assemblies for in-vehicle stowage of vehicular keys and key fobs while operating vehicles.

BACKGROUND

Many newer sport-utility vehicles, cars, vans, trucks, and other vehicles use key fobs and push-to-start buttons for starting them. Many of these key fobs are much larger than the traditional ignition keys for traditional turn-to-start starters. Consequently, it can be inconvenient to carry such a relatively large key fob in a pants pocket or similar location, especially if the key fob is on a keychain that includes one or more traditional keys and/or other item(s), such as a door-access security fob and/or a keychain charm, among others. Even if not carrying a vehicle key fob in a pants pocket or the like, it can be difficult to find a place in a vehicle to conveniently stow the vehicle key fob while operating the vehicle.

SUMMARY

In one implementation, the present disclosure is directed to an integrated keychain assembly, which includes a keychain fob and a receiver-base that mechanically interlock with one another so as to provide a conformal mechanical interlocking fit so that the receiver-base resists gravity forces imposed on the receiver-base by the keychain fob in a first direction when the receiver-base is affixed to a support structure; and magnetically attract one another, in a second direction substantially perpendicular to the first direction, when in the conformal mechanical interlocking fit with one another so as to hold the keychain fob in the conformal mechanical interlocking fit, wherein: the keychain fob includes: a body having a first mechanical-interlock structure and a first magnetic-attraction portion; a first magnetic-attraction element engaged with the first magnetic-attraction portion; and a keyholder support located below the first magnetic-attraction region; and the receiver-base is designed and configured to receive only the keychain fob, the receiver-base including: a second magnetic-attraction portion having a fob-receiving region designed and configured to confrontingly receive the body of the keychain fob; a second mechanical-interlock structure, wherein the first and second mechanical interlock structures comprise complementary male-female structures configured so that, when the receiver-base is affixed to the support structure, the first mechanical-interlock structure engages the second mechanical interlock structure as a user moves the keychain fob, in the second direction, into the conformal mechanical interlocking fit with the receiver-base and the conformal mechanical interlocking fit prevents the keychain fob from disengaging the receiver-base in a downward direction; an attachment means for fixedly attaching the receiver-base to the structure; and a second magnetic-attraction element engaged with a second magnetic-attraction portion, wherein the first and second magnetic attraction elements are selected, located, and oriented so as to be magnetically attracted to one another.

In another implementation, the present disclosure is directed to a method, which includes providing an integrated keychain assembly described immediately above; and providing instructions to attach a vehicle key fob or a vehicle key to the keychain fob and to fixedly secure the receiver-base on a support structure within an interior of a vehicle.

BRIEF DESCRIPTION OF THE DRAWINGS

For the purpose of illustration, the accompanying drawings show aspects of one or more embodiments made in accordance with the present disclosure. However, it should be understood that the scope of this disclosure is/are not limited to the precise arrangements and instrumentalities shown in the drawings, wherein:

FIG. 1A is a perspective view of an integrated keychain assembly of the present disclosure shown engaged with a vehicle dashboard and holding a vehicle key fob;

FIG. 1B is an enlarged view of the integrated assembly of FIG. 1A, showing the keychain fob separated from the keychain holder;

FIG. 1C is an enlarged cross-sectional view of the integrated assembly of FIG. 1A, as taken along line 1C-1C of FIG. 1A, sans the keyholder;

FIG. 2 is a front elevational view of another integrated keychain assembly of the present disclosure, showing the keychain fob and the keychain holder disengaged from one another but in their proper gravity-centric orientations;

FIG. 3 is a front elevational view of yet another integrated keychain assembly of the present disclosure, showing the keychain fob and the keychain holder disengaged from one another but in their proper gravity-centric orientations;

FIG. 4A is a front elevational view of a further integrated keychain assembly of the present disclosure, showing the keychain fob properly engaged with the keychain holder and the keychain assembly in its proper gravity-centric orientation; and FIG. 4B is a side elevational view of the integrated keychain assembly of FIG. 4A with the keychain fob engaged with the keychain holder, showing features that make the keychain fob easy to grasp and remove from the keychain holder.

DETAILED DESCRIPTION

Overview

In some aspects, the present disclosure is directed to integrated keychain assemblies that each include a keychain fob and a keychain holder that is configured to hold only one instantiation of the keychain fob at a time. In some embodiments, an integrated keychain assembly of the present disclosure can be particularly designed and configured to be deployed in a vehicle so that a driver of the vehicle can stow a vehicle key fob while operating the vehicle. As mentioned in the Background section above, vehicle key fobs are typically significantly larger than traditional vehicle ignition keys, and, consequently, it can be inconvenient to carry the vehicle key fob in a pants pocket or the like or to find a convenient location in a vehicle to stow the vehicle key fob while operating the vehicle. An integrated keychain assembly of the present disclosure can remedy both of these situations. It is noted that while the present disclosure generally focuses on vehicle key fobs as a use for an integrated keychain assembly of the present disclosure, integrated keychain assemblies of the present disclosure can be used for other items that people carry on keychains, such as traditional ignition keys, house keys, door-access security fobs, and keychain charms, among other things, and any combination of these with or without a vehicle key fob. This list is not intended to be exhaustive but rather merely illustrative.

In some embodiments, the keychain fob includes a body and a keyholder, such as a key ring or one or more key hooks, that is/are secured to the body via a keyholder support. When provided (e.g., when a user does not add one of her/his own), the keyholder may be configured to removably receive one or more items, including, but not limited to, a vehicle key fob, a vehicle ignition key, a door-access security fob, and/or keychain charm, among others. The body includes at least one magnetic-attraction element integrated therewith. Each magnetic-attraction element may be either a magnet or a body made of a material attracted to the magnet. The body has a shape that is designed to engage with the keychain holder with a conformal mechanical interlocking fit that prevents the body and the keychain fob from moving relative to the keychain holder under the influence of gravity when the keychain holder is properly installed in its use position. Generally, a "conformal mechanical interlocking fit" is an engagement in which one or more parts of the body conformally engage one or more corresponding parts on the keychain holder such that the one or more corresponding parts on the keychain holder mechanically hold the keychain fob against the force of gravity when the integrated keychain assembly is properly deployed and used. Several examples of conformal mechanical interlocking fits are shown in the accompanying drawings and described below.

In some embodiments, the keychain holder includes a receiver-base that is designed and configured to provide the conformal mechanical interlocking fit for the body of the keychain fob. The receiver-base includes one or more magnetic-attraction elements that are complementary to the magnetic-attraction element(s) of the body of the keychain fob so that the magnetic-attraction elements of the body and the receiver-base are magnetically attracted to one another so as to maintain the body in the conformal-mechanical-interlock-fit engagement with the receiver-base during use of the integrated assembly. In this connection, it is emphasized that the primary holding power of the receiver-base relative to gravity loads on the body of the keychain fob is the conformal mechanical interlocking fit. The primary function of the magnetic attraction, on the other hand, is to hold the body of the keychain fob in engagement with the receiver-base so as to maintain the conformal mechanical interlock fit. It is the combination of the conformal mechanical interlock fit and the attraction of the magnetic-attraction elements, which may be a relatively weak attraction, that allows the integrated keychain holder to securely hold one or more relatively heavy vehicle key fobs and/or one or more other items while at the same time allowing a user to easily remove the keychain fob from the keychain holder. This is due to the conformal mechanical interlock fit bearing the majority of the gravity loads from the keychain fob and the item(s) attached to it.

In some embodiments, a keychain holder of the present disclosure further includes an attachment means for attaching the receiver-base to a support structure, such as a dashboard component of a vehicle, a door panel of a vehicle, or an interior wall of a building, such as a house, apartment, condominium, or garage, among many other types of support structures. The attachment means may be any means suitable for the particular application at issue, such as, but not limited to, an adhesive, an adhesive pad, a double-sided tape, a suction cup, a clip, a hanger, or a mechanical fastener, among others. In some embodiments it is desirable that the attachment means allows the receiver-base to be removed without marring the structure (e.g., surface) to which is was attached.

In some aspects, the present disclosure is directed to methods of providing integrated keychain assembly kits and instructing users on their use. In some embodiments, an integrated keychain assembly kit includes one or more keychain holders and one or more keychain fobs, wherein each keychain holder is configured to hold a single keychain fob. As an example, an integrated keychain assembly kit includes a single keychain holder and a single keychain fob. In this example, such a kit may be for a single user and a single vehicle. In another example, an integrated keychain assembly kit may include a single keychain holder and multiple like keychain fobs. In this example, such a kit may be for multiple users and a single vehicle. As a further example, an integrated keychain assembly kit may include multiple keychain holders and a single keychain fob. In this example, such a kit may be for a single vehicle where one of the keychain holders is for deploying in a single vehicle and each other keychain holder is for deploying in another location, such as in a user's home or office. As a still further example, an integrated keychain assembly kit may include multiple keychain holders and multiple keychain fobs. In this example, such a kit may be for multiple vehicles, multiple users, and/or multiple non-vehicle mountings. Those skilled in the art will readily appreciate the variety of configurations of an integrated keychain assembly kit made in accordance with the present disclosure.

Suitable instructions for using components of an integrated keychain assembly kit may be provided, wherein the content of the instructions are tailored to the particular kit and use application at issue. For example, in some embodiments, the instructions may include directions for mounting at least one keychain holder in the interior of a vehicle, such as on a dashboard component, a door panel, a ventilation system vent, etc. The instructions may further include instructions for using the keychain fob to hold at least one of a vehicle key fob and/or a vehicle key, as well as instructions for engaging the body of the keychain fob with the receiver-base of the keychain holder. In some embodiments, the instructions may include instructions for providing multiple users of the same vehicle with their own keychain fobs, all of which are designed to engage a single keychain-fob keychain holder. In some embodiments, the instructions may include instructions for deploying at least one keychain holder in a non-vehicle location, such as any of the locations mentioned above. Any instructions and/or directions may be provided in graphical form, verbal form, video form, oral form, or any suitable combination thereof. In some embodiments, the instructions may accompany an integrated keychain assembly kit. In some embodiments, packaging and/or an insert to packaging may include one or more indicia (e.g., a QR code, URL, etc.) for directing a user to an online source of the instructions, such as a seller's webpage or a YouTube video, among others. Those skilled in the art will readily appreciate the myriad of ways that instructions can be provided for using and integrated keychain assembly kit of the present disclosure or any component(s) thereof.

The foregoing and other aspects of the present disclosure are described below in connection with a set of examples. It is to be understood that the below examples are merely illustrative and not to be considered limiting the breadth of the actual innovation.

EXAMPLES

Referring now to the drawings. FIG. 1A illustrates an example integrated keychain assembly 100 made in accordance with aspects of the present disclosure. In this example, the integrated keychain assembly 100 includes a keychain fob 104 and a keychain holder 108. For context, FIG. 1A shows the integrated assembly 100 with the keychain fob 104 fully engaged with the keychain holder 108 and holding a vehicle key fob 112 and with the keychain holder affixed to a dashboard 116DB of a vehicle 116. As alluded to above, this application of the integrated keychain assembly 100 is merely illustrative and is not limiting. Rather, a user may deploy the integrated keychain assembly 100 in any desired application.

FIG. 1B shows the keychain fob 104 disengaged from the keychain holder 108 and the keychain holder in isolation from any application, such as the vehicle application of FIG. 1A. In this example, the keychain holder 108 includes a receiver-base 120 having a fob-receiving portion 120FR and a first mechanical-interlock structure 120MI, which in this case is formed monolithically with the fob-receiving portion. The keychain holder 108 in this example contains a magnetic-attraction element 124 located beneath the surface 120S of the fob-receiving portion 120FR. In this example, the entire receiver-base 120 is made of a suitable plastic, and the magnetic-attraction element 124 is embedded within the plastic, as best seen in FIG. 1C. In other embodiments, the receiver-base 120 may be made of one or more other materials, such as, but not limited to, wood, ceramic, metal, and/or hard rubber, among others. In some embodiments, the magnetic-attraction element 124 is preferably a magnet. However, it could also be a non-magnetic magnetically attractable material, such as a material containing iron, cobalt, and/or nickel, among others. When the magnetic-attraction element 124 is a magnet, it may be any suitable type of magnet, such as a neodymium magnet, samarium magnet, cobalt magnet, alnico magnet, or ferrite magnet, among others. In some embodiments, the single magnetic-attraction element 124 may be replaced by multiple magnetic-attraction elements.

As also shown in FIG. 1B, the keychain fob 104 comprises a body 128 having a second mechanical-interlock structure 128MI and a magnetic-attraction-element portion 128P fixedly attached to the second mechanical-interlock structure. In this example, the second-mechanical-interlock structure 120MI is designed and configured to have a conformal mechanical interlocking fit with the first mechanical-interlock structure 120MI of the keychain holder 108 when the keychain fob 104 is fully engaged with the keychain holder 108, as shown in FIG. 1A. Referring back to FIG. 1B, the magnetic-attraction-element-portion 128P contains a magnetic-attraction element 132 that is magnetically complementary to the magnetic-attraction element 124 of the receiver-base 120. As seen in FIG. 1C, like the magnetic-attraction element 124 of the receiver-base 120, the magnetic-attraction element 132 of the body is embedded in the body 128.

In some embodiments, the magnetic-attraction element 132 is preferably a non-magnetic magnetically attractable material, such as a material containing iron, cobalt, and/or nickel, among others. In such embodiments, a non-magnetic magnetically attractable material is preferred because the keychain fob 104 is the part of the integrated assembly 100 that a user (not shown) carries around and, therefore, may expose to non-magnetic magnetically attractable material that is prone to be in the general environment of the user. Using a non-magnetic magnetically attractable material in the keychain fob 104 will prevent accidental attraction to such environmental non-magnetic magnetically attractable material. In some embodiments, the magnetic-attraction element 132 may be a magnet. When the magnetic-attraction element 132 is a magnet, it may be any suitable type of magnet, such as a neodymium magnet, samarium magnet, cobalt magnet, alnico magnet, or ferrite magnet, among others. In some embodiments, the single magnetic-attraction element 132 may be replaced by multiple magnetic-attraction elements.

As best seen in FIG. 1A, the sizes and shapes of the magnetic-attraction-element portion 128P and the corresponding fob-receiving portion 120FR of the receiver-base 120 are such that the combination of the receiver-base and the body 128 match one another both around their outermost periphery (i.e., a circumferential direction laterally around the integrated assembly 100 (FIG. 1A)) and in a direction of the thicknesses of the receiver-base and the body (FIG. 1C). As can be readily seen, especially in FIG. 1A, when the receiver-base 120 and the body 128 are properly engaged with one another, they complement one another so as to form a cylindrical assembly having an assembled common diameter, $D_C$ (FIG. 1C), and an assembled single depth, $D_S$ (FIG. 1C). It is noted that this cylindrical configuration of the assembled integrated keychain assembly 100 can be generalized by defining the term "assembled common periphery" (see 100P in FIG. 1A) to cover any common assembled shape other than cylindrical, such as right-rectangular parallelpiped, triangular prismatic, or ovular prismatic, among others. In addition, the tight mechanical fits of the first and second mechanical-interlock structures 120MI and 128MI with one another (FIG. 1A), as well as the close fit between the confronting surface 120CS and 128CS (see FIG. 1B for labels), respectively, of the receiver-base 120 and the body 128 largely prevent the keychain fob 104 from pivoting in the direction of arrow 134 in FIG. 1A when the vehicle key fob 112 is swinging from side to side, such as when the vehicle 116 is cornering and/or moving on a bumpy road, among other things. In the example shown, and as best seen in FIG. 1B, the mechanical-interlock structure 128MI comprises a generally cylindrical head 128H that conformally engages a like-shaped receiver 120R of the mechanical-interlock structure 120MI. In other embodiments, the shape of the head 128H and the receiver 120R may be a shape other than generally cylindrical, such as ovoid prismatic, or triangular prismatic, rectangular prismatic, among many others. In some embodiments, a single head 128H and a single corresponding receiver 120R may be replaced by multiple heads and multiple corresponding receivers.

In this embodiment, the keychain fob 104 includes a keyholder 136 and a keyholder support 140 that secures the keyholder to the body 128. The keyholder 136 may be any suitable keyholder, such as a keyring (shown) or one or more key hooks, among others. In the example shown, the keyholder support 140 is integrated with the body 128, here, as a molded part of the body. In other embodiments, the keyholder support 140 may be formed separately and subsequently attached to the body 128.

FIG. 2 illustrates another integrated keychain assembly 200 made in accordance with aspects of the present disclosure. This integrated keychain assembly 200 has a keychain fob 204 and a keychain holder 208 that are substantially identical, respectively, to the keychain fob 104 and the keychain holder 108 of FIGS. 1A through 1C, except that the keyholder support 212 and keyholder 216 are located in a different location than the keyholder support 140 and keyholder 136 of FIGS. 1A through 1C and are oriented differently. FIG. 2 shows the orientations of the keychain fob 204 and keychain holder 208 during use, i.e., with the keyholder 216 hanging down from the body 220. As with the integrated keychain assembly 100 of FIGS. 1A through 1C, the first and second mechanical-interlock structures 224 and 228 on the keychain fob 204 and keychain holder 208, respectively, keep the keychain fob from moving downward relative to the keychain holder, and corresponding magnetic-attraction elements 232, 236, respectively, hold the body 220 of the keychain fob in engagement with the receiver-base 240 of the keychain holder in a direction into and out of the page containing FIG. 2. All other aspects of the keychain fob 204 and keychain holder 208 of FIG. 2 may be the same as or similar to the keychain fob 104 and keychain holder 108 of FIGS. 1A through 1C. It is noted that, like the integrated keyholder assembly 100 of FIG. 1A, the integrated keyholder assembly 200 of FIG. 2 also has an assembled common periphery 200P.

FIG. 3 illustrates yet another integrated keychain assembly 300 made in accordance with aspects of the present disclosure. The integrated keychain assembly 300 of FIG. 3 includes a keychain fob 304 and a corresponding keychain holder 308 that removably receives the keychain fob. In this example, the receiver-base 312 of the keychain holder 308 and the body 316 of the keychain fob 304 are largely the same size as one another in the plane of the page containing FIG. 3 (here, having largely the same diameters). However, the receiver-base 312 further includes a mechanical-interlock structure 320 composed of two curved stops 320(1) and 320(2) separated by a gap 320G, which in this embodiment conformally receives a portion 324P of the keyholder support 324 on the keychain fob 304 when the keychain fob is fully engaged with the receiver-base. Although this is not shown, the reader can readily appreciate that when the portion 324P of the keyholder support 324 is engaged in the gap 320G of the mechanical-interlock structure 320, the resulting conformal fit between that portion and the gap inhibits the body 316 of the keychain fob 304 from pivoting in the direction of arrow 328 when the item(s) (not shown) on the keyholder 332 are swinging side to side, for example, under the influence of the motion of a vehicle (not shown) in which the integrated keychain assembly 300 is used. In this example, it is noted that there is no structure on the receiver-base 312 located above the body 316.

Each of the receiver-base 312 and the body 316 includes a corresponding magnetic-attraction element 336, 340 for magnetically holding the keychain fob 304 into engagement with the keychain holder 308 in a direction into and out of the page containing FIG. 3. In this example, the entire body 316 may be considered to be the mechanical-interlock structure of the keychain fob 304 because of the way it is captured by the mechanical-interlock structure 320 of the receiver-base 312. All other aspects of the keychain fob 304 and keychain holder 308 of FIG. 3 may be the same as or similar to the keychain fob 104 and keychain holder 108 of FIGS. 1A through 1C. It is noted that, similar to each of the integrated keyholder assemblies 100 and 200 of FIGS. 1A and 2, the integrated keyholder assembly 300 of FIG. 3 substantially has an assembled common periphery 300P. As used herein and in the appended claims, the term "substantially" when used in connection with the term "assembled common periphery", allows for the assembled common periphery to differ only by the presence of any mechanical-interlock structure, or portion thereof on the receiver-base that extends beyond what would otherwise be the assembled common periphery. In the example integrated keychain assembly, the mechanical-interlock structure 320 on the receiver-base 312 is located beyond the circle 344 that would otherwise define the assembled common periphery 300P and, thus, fits this definition.

FIGS. 4A and 4B illustrate yet another integrated keychain assembly 400 made in accordance with aspects of the present disclosure. In this example, the integrated keychain assembly 400 includes keychain fob 404 and a keychain holder 408, wherein the keychain holder and keychain fob are designed and configured to allow a user (not shown) to easily grasp the keychain fob to remove it from the keychain holder. In this example, the receiver-base 412 includes a mechanical-interlock structure 416MI that includes a gap 416G for receiving a portion of a keyholder support 420 on the keychain fob 404 and a pair of gaps 416G(1) and 416G(2) that oppose one another and provide a corresponding pair of grasping regions 424(1) and 424(2) that allow a user (not shown) to easily grasp the body 428 of the keychain fob 404 with a finger and thumb (not shown) to remove the keychain fob from the keychain holder.

As seen in FIG. 4B, in this example, the depth, $D_B$, of the body 428 is greater than the depth, $D_{MI}$, of the mechanical-interlock structure 416MI to make it easier for the user to grasp the body to remove the keychain fob 404 from the keychain holder 408. As in other embodiments, each of the body 428 and the receiver-base 412 includes a corresponding magnetic-attraction element 432, 436 for magnetically holding the keychain fob 404 into engagement with the keychain holder 408 in a direction into and out of the page containing FIG. 4A. In this example, the entire body 428 may be considered to be the mechanical-interlock structure of the keychain fob 404 because of the way it is captured by the mechanical-interlock structure 416MI of the receiver-base 412. All other aspects of the keychain fob 404 and keychain holder 408 of FIG. 4 may be the same as or similar to the keychain fob 104 and keychain holder 108 of FIGS. 1A through 1C.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An integrated keychain assembly, comprising:
a keychain fob and a receiver-base that:
mechanically interlock with one another so as to provide a conformal mechanical interlocking fit so that the receiver-base resists gravity forces imposed on the receiver-base by the keychain fob in a first direction when the receiver-base is affixed to a support structure; and
magnetically attract one another, in a second direction substantially perpendicular to the first direction, when in the conformal mechanical interlocking fit with one another so as to hold the keychain fob in the conformal mechanical interlocking fit, wherein:
the keychain fob includes:
a body having a first mechanical-interlock structure and a first magnetic-attraction portion;
a first magnetic-attraction element engaged with the first magnetic-attraction portion; and
a keyholder support located below the first magnetic-attraction portion-region; and
the receiver-base is designed and configured to receive only the keychain fob, the receiver-base including:
a second magnetic-attraction portion having a fob-receiving region designed and configured to confrontingly receive the body of the keychain fob;
a second mechanical-interlock structure, wherein the first and second mechanical interlock structures comprise complementary male-female structures configured so that, when the receiver-base is affixed to the support structure, the first mechanical-interlock structure engages the second mechanical interlock structure as a user moves the keychain fob, in the second direction, into the conformal mechanical interlocking fit with the receiver-base and the conformal mechanical interlocking fit prevents the keychain fob from disengaging the receiver-base in a downward direction;
an attachment means for fixedly attaching the receiver-base to the structure; and
a second magnetic-attraction element engaged with a second magnetic-attraction portion, wherein the first and second magnetic attraction elements are selected, located, and oriented so as to be magnetically attracted to one another;
wherein the second mechanical-interlock structure on the receiver-base includes a pair of gaps located on opposite side of the receiver-base, wherein the pair of gaps define a corresponding pair of grasping regions that allow the user to grasp the body of the keychain fob when the integrated keychain assembly is deployed and the keychain fob is in the conformal mechanical interlocking fit with the receiver-base.

2. The integrated keychain assembly of claim 1, wherein the body and the receiver-base have complementary shapes so that, when the body is engaged with the receiver-base, the body and the receiver-base substantially have an assembled common periphery.

3. The integrated keychain assembly of claim 2, wherein the assembled common periphery is circular.

4. The integrated keychain assembly of claim 3, wherein, when the body is engaged with the receiver-base, the body and the receiver-base have an assembled single depth.

5. The integrated keychain assembly of claim 2, wherein, when the body is engaged with the receiver-base, the body and the receiver-base have an assembled single depth.

6. The integrated keychain assembly of claim 1, wherein, when the integrated keychain assembly is deployed and the keychain fob is in the conformal mechanical interlocking fit with the receiver-base:
the first magnetic-attraction portion is spaced from the first mechanical-interlock structure; and
the second magnetic-attraction portion is spaced from the second mechanical interlock structure.

7. The integrated keychain assembly of claim 6, wherein the first magnetic-attraction portion is located below the first mechanical-interlock structure when the integrated keychain assembly is deployed and the keychain fob is in the conformal mechanical interlocking fit with the receiver-base.

8. The integrated keychain assembly of claim 6, wherein the first magnetic-attraction portion is located above the first mechanical-interlock structure when the integrated keychain assembly is deployed and the keychain fob is in the conformal mechanical interlocking fit with the receiver-base.

9. The integrated keychain assembly of claim 6, wherein the first magnetic-attraction portion is located laterally adjacent to the first mechanical-interlock structure when the integrated keychain assembly is deployed and the keychain fob is in the conformal mechanical interlocking fit with the receiver-base.

10. The integrated keychain assembly of claim 1, wherein the second mechanical-interlock structure consists of a pair of stops located beneath the body when the integrated keychain assembly is deployed and the keychain fob is in the conformal mechanical interlocking fit with the receiver-base.

11. The integrated keychain assembly of claim 10, wherein the pair of stops are separated by a gap that conformally receives a portion of the keyholder support when the integrated keychain assembly is deployed and the keychain fob is in the conformal mechanical interlocking fit with the receiver-base.

12. The integrated keychain assembly of claim 1, wherein the pair of gaps and the corresponding pair of grasping regions are located on opposite lateral side of the receiver-base when the integrated keychain assembly is deployed.

13. The integrated keychain assembly of claim 1, further comprising an additional gap that conformally receives a portion of the keyholder support when the integrated keychain assembly is deployed and the keychain fob is in the conformal mechanical interlocking fit with the receiver-base.

14. The integrated keychain assembly of claim 1, wherein the attachment means comprises an adhesive pad.

15. The integrated keychain assembly of claim 1, wherein the keychain fob further includes a keyholder.

16. A method, comprising:
providing an integrated keychain assembly of claim 1; and
providing instructions to attach a vehicle key fob or a vehicle key to the keychain fob and to fixedly secure the receiver-base on a support structure within an interior of a vehicle.

17. The method of claim 16, wherein the body and the receiver-base have complementary shapes so that, when the body is engaged with the receiver-base, the body and the receiver-base substantially have an assembled common periphery.

18. The method of claim 16, wherein, when the integrated keychain assembly is deployed and the keychain fob is in the conformal mechanical interlocking fit with the receiver-base:

the first magnetic-attraction portion is spaced from the first mechanical-interlock structure; and the second magnetic-attraction portion is spaced from the second mechanical interlock structure.

\* \* \* \* \*